United States Patent [19]
Wagganer

[11] Patent Number: 6,069,317
[45] Date of Patent: May 30, 2000

[54] JUNCTION BOX FOR FACILITATING THE INSTALLATION OF ELECTRICAL CABLE THEREIN

[76] Inventor: Gary W. Wagganer, 803 High St., No. 12, Fredericktown, Mo. 63645

[21] Appl. No.: 09/340,590

[22] Filed: Jun. 28, 1999

[51] Int. Cl.⁷ .................................................. H02G 3/18
[52] U.S. Cl. ......................................... 174/65 R; 220/3.8
[58] Field of Search .............................. 174/65 R, 17 C, 174/50; 220/3.2, 3.8

[56] References Cited

U.S. PATENT DOCUMENTS

| | | | |
|---|---|---|---|
| 598,498 | 2/1898 | Close | 220/3.8 |
| 982,535 | 1/1911 | Rudkiewicz | 220/3.2 |
| 1,402,769 | 1/1922 | Hirshfeld | 174/50 X |
| 1,777,504 | 10/1930 | Selah | 220/3.8 |
| 1,850,759 | 3/1932 | Macneil | 220/3.94 |
| 1,927,780 | 9/1933 | Anderson | 220/3.8 X |
| 2,640,619 | 6/1953 | Schneiderman | 220/3.2 |
| 2,987,909 | 6/1961 | Shlank | 220/3.8 X |
| 3,029,965 | 4/1962 | Maier | 220/3.8 |
| 3,392,228 | 7/1968 | Zerwes | 220/3.8 X |
| 3,430,799 | 3/1969 | Maier | 220/3.94 |
| 3,483,309 | 12/1969 | Kerseg et al. | 174/65 R |
| 4,366,343 | 12/1982 | Slater et al. | 174/65 R |
| 4,424,406 | 1/1984 | Slater et al. | 174/65 R |
| 4,605,816 | 8/1986 | Jorgensen et al. | 174/65 R |
| 4,936,478 | 6/1990 | Bozdeck | 174/65 R X |
| 4,972,044 | 11/1990 | Kropa | 174/65 R |
| 5,360,130 | 11/1994 | Lehmann et al. | 220/3.8 |
| 5,679,924 | 10/1997 | Young et al. | 174/50 |

*Primary Examiner*—Dean A. Reichard
*Attorney, Agent, or Firm*—Richard L. Miller, P.E.

[57] ABSTRACT

An improved junction box for perpendicularly conducting stiff electrical cable and of a type having an elongated housing with an open top, a base, a pair of side walls and a pair of end walls extending upwardly from the base of the elongated housing, a cover replaceably closing the open top of the elongated housings by at least one first screw, a first gasket weather sealing the cover to the elongated housing, a first stub conduit extending axially outwardly from one end wall of and communicating with the elongated housing, and a second stub conduit depending from and communicating with the base of the elongated housing adjacent the other end wall of the housing and perpendicular to the first stub conduit. The improvement includes the one end wall of the housing being replaceably attached to the base of the elongated housing and the pair of side walls of the elongated housing so as to facilitate running the stiff electrical cable through the second stub conduit bending it perpendicularly through the housing and out through the first stub conduit without damage by virtue of a clear passage being provided when the cover and the one end wall of the elongated housing are removed.

10 Claims, 2 Drawing Sheets

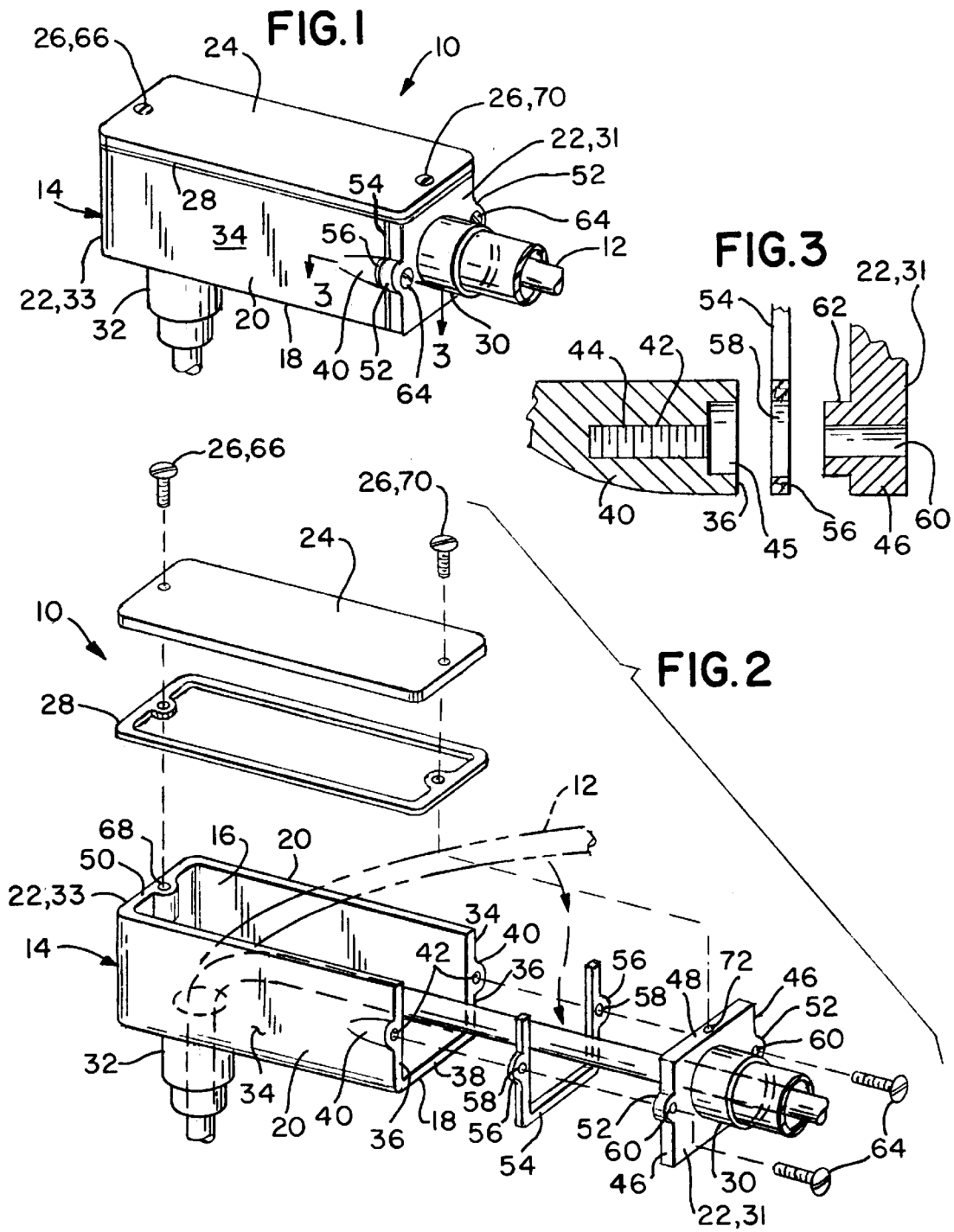

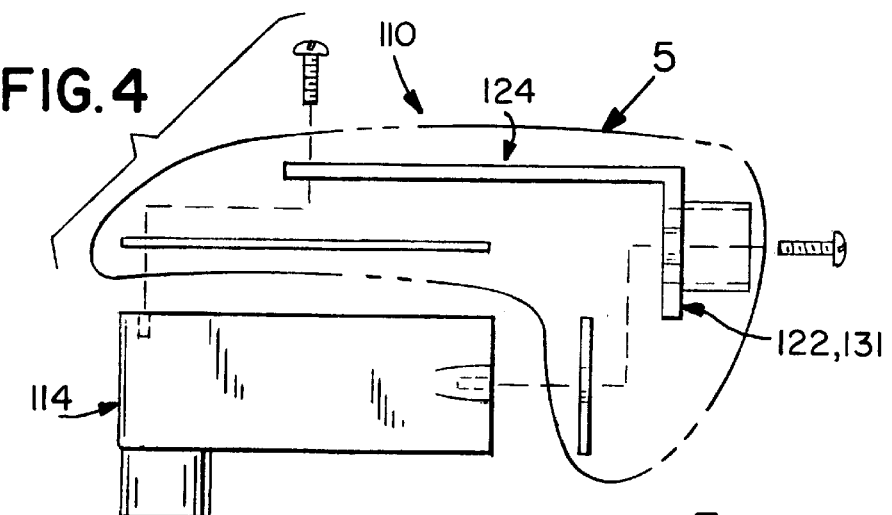
FIG.4
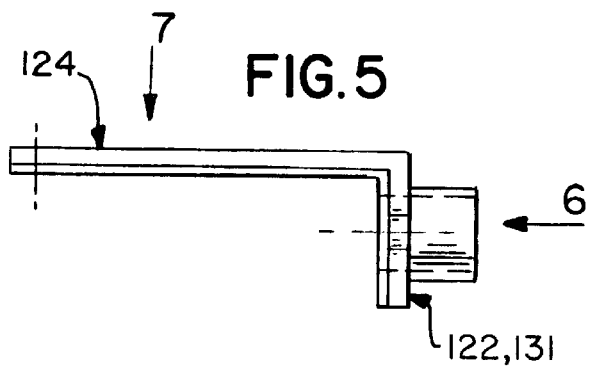
FIG.5
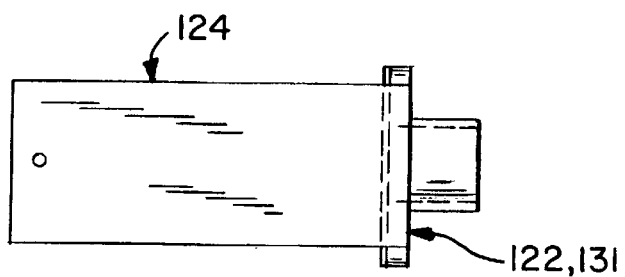
FIG.6
FIG.7

JUNCTION BOX FOR FACILITATING THE INSTALLATION OF ELECTRICAL CABLE THEREIN

BACKGROUND OF THE INVENTION

1. Field of the Invention

The present invention relates to a junction box. More particularly, the present invention relates to an improved junction box for facilitating the installation of electrical cable therein.

2. Description of the Prior Art

Installing residential entrance cable in existing LB's is difficult. The stiff electrical cable take tremendous strength and care to install without damage.

Numerous innovations for junction boxes have been provided in the prior art that will be described. Even though these innovations may be suitable for the specific individual purposes to which they address, however, they differ from the present invention.

A FIRST EXAMPLE, U.S. Pat. No. 1,366,343 to Slater et al. teaches the structure that includes a pair of flange members depending angularly towards each other from opposite sides of each electrical power cable entry port formed in a sidewall portion of an electrical outlet box, with each pair of cooperating flange members adapted to enable essentially complete closure of the cable entry port. According to one aspect, each cooperating pair of flange members comprises a pair of cable grasping detent flanges, each spaced from its corresponding wall portion by a base-like projection to accommodate an entry port closure panel. According to another aspect, the inward edges of each cooperating pair of flange members are coupled together to close the cable entry port which may be formed with a portion extending into the back wall, with a rigid flange depending from the sidewall portion and extending parallel to the front edges of the flange members. Each pair of flange members may be a pair of cable grasping detent flanges coupled together by a frangible web-like member extending between their grasping edges, or the flange members may be relatively thin panel members forming a shallow angle with their corresponding sidewall portions, with their adjacent edges joined directly to each other.

A SECOND EXAMPLE, U.S. Pat. No. 4,424,406 to Slater et al. teaches an electrical outlet box that his electrical power cable entry ports in which one or more closure panels are each mounted adjacent the rim of the aperture along one edge portion only of the panel, the remaining portion of each panel being free and extending substantially across the aperture in a direction angularly inwardly from the panel of the aperture. The closure panels are each either hingedly mounted or sufficiently flexible and resilient so as to be self-opening, such that each free end portion is deflected away from the opening upon passage of the cable into the aperture by manual force, and thereafter resistingly bears against the installed cable. Each panel may be tapered so as to have increased thickness at the base, in which case the panels are self-clamping against removal of the cable from the aperture, and may include supplementary cable gripping projections on their outwardly facing surfaces. The closure panel or panels may also be self-locating and self-adjusting for different cable sizes up to a maximum size equal to the size of the aperture. Access to the box through the cable entry port may be substantially prevented by a frangible closure member, either as a thin web joining the free end of a single closure panel to the wall structure of the box or joining the free ends of two or more panels together, or as a separate conventional knockout panel frangibly interconnected to the rim of the cable entry aperture. The closure panel or panels and outlet box also may be formed as an integral structure.

A THIRD EXAMPLE, U.S. Pat. No. 4,605,816 to Jorgensen et al. teaches a molded, thermoplastic outlet box that is provided with openings near the back wall and clamp arrangements inside the openings. Each clamp arrangement includes a swingable clamp arm having teeth at the end thereof which cooperate with teeth formed on an inner wall of the box to engage a cable which has been inserted. An abutment prevent the clamp arm from swinging inwardly until a predetermined force has been exceeded. Flexibility of the arm is enhanced by parallel slots extending away from the opening on opposite sides of the clamp arm.

A FOURTH EXAMPLE, U.S. Pat. No. 4,972,044 to Kropa teaches a plastic electrical junction box having integrally formed resilient arms for clamping a cable. The arms are formed with plural segments which are joined at bends.

A FIFTH EXAMPLE, U.S. Pat. No. 5,360,130 to Lehmann et al. teaches a junction box having a housing and a cover. The housing includes a housing wall extending upwardly from a base about the periphery thereof. A lip extends outwardly about the top edge of the housing wall and engages in a snap fit in a channel in a wall of the cover. A pair of inner walls which depend from the cover top prevent the housing from inadvertently being disengaged.

A SIXTH EXAMPLE, U.S. Pat. No. 5,679,924 to Young et al. teaches a non-metallic floor box for use in electrical in-floor power and communication distribution systems for office buildings and the like. One embodiment of the floor box includes a closeted housing having a base, a top and vertically extending side walls defining an interior volume. The disclosed floor box prevents concrete from entering the housing during pouring and setting of the concrete floor, and is adapted to be cut off substantially flush with and parallel to the concrete floor in which it is set. The floor box housing includes gradient markings disposed on at least one of its side walls to indicate the interior volume of the housing and/or the depth of the concrete floor.

It is apparent that numerous innovations for junction boxes have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an improved junction box that a,voids the disadvantages of the prior art.

ANOTHER OBJECT of the present intention is to provide an improved junction box that is simple and inexpensive to manufacture.

STILL ANOTHER OBJECT of the present invention is to provide an improved junction box that is simple to use.

BRIEFLY STATED, YET ANOTHER OBJECT of the present invention is to provide an improved junction box for perpendicularly conducting stiff electrical cable and of a type having an elongated housing with an open top, a base, a pair of side walls and a pair of end walls extending upwardly from the base of the elongated housing, a cover replaceably closing the open top of the elongated housing by at least one first screw, a first gasket weather sealing the cover to the elongated housing, a first stub conduit extending axially outwardly from one end wall of and communicating with the elongated housing, and a second stub conduit depending from and communicating with the base of the elongated housing adjacent the other end wall of the housing and perpendicular to the first stub conduit. The improvement includes the one end wall of the housing being replaceably attached to the base of the elongated housing and the pair of side walls of the elongated housing so as to facilitate running the stiff electrical cable through the second stub conduit bending it perpendicularly through the housing and out through the first stub conduit without damage by virtue of a clear passage being provided when the cover and the one end wall of the elongated housing are removed.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic perspective view of a first embodiment of the present invention;

FIG. 2 is an exploded diagrammatic perspective view of the present invention shown in FIG. 1;

FIG. 3 is an enlarged exploded diagrammatic cross sectional view taken on line 3—3;

FIG. 4 is an exploded diagrammatic side elevational view of a second embodiment of the present invention;

FIG. 5 is a diagrammatic side elevational view of the area generally enclosed by the dotted curve identified by arrow 5 in FIG. 4;

FIG. 6 is an enlarged diagrammatic end elevational view taken generally in the direction of arrow 6 in FIG. 5; and FIG. 7 is an enlarged diagrammatic top plan view taken generally in the direction of arrow 7 in FIG. 5.

LIST OF REFERENCE NUMERALS UTILIZED
IN THE DRAWING

First Embodiment 10 improved junction box of the present invention
12 stiff electrical cable
14 elongated housing
16 open top of elongated housing 14
18 base of elongated housing 14
20 pair of side walls of elongated housing 14
22 pair of end walls of elongated housing 14
24 cover
26 at least one first screw
28 first gasket
30 first stub conduit
31 one end wall of pair of end walls 22 of elongated housing 14
32 second stub conduit
33 other end wall of pair of end walls 22 of elongated housing 14
34 exterior surface of each side wall of pair of side walls 20 of elongated housing 14
36 end edge of each side wall of pair of side walls 20 of elongated housing 14
38 end edge of base 18 of elongated housing 14
40 pod on end edge 36 of each side wall of pair of side walls 20 of elongated housing 14
42 throughbore in pod 40 on end edge 6 of each side wall of pair of side walls 20 of elongated housing 14
44 first portion of throughbore 42 in end edge 36 of each side wall of pair of side walls 20 of elongated housing 14
45 second portion of throughbore 42 in end edge 36 of each side wall of pair of side walls 20 of elongated housing 14
46 pair of side edges of one end wall 31 of pair of end walls 22 of elongated housing 14
48 top edge of one end wall 31 of pair of end walls 22 of elongated housing 14
50 top edge of other end wall 33 of pair of end walls 22 of elongated housing 14
52 tab on each side edge of pair of side edges 46 of one end wall 31 of pair of end walls 22 of elongated housing 14
54 second gasket
56 pair of ears on second gasket 54
58 throughbore in each ear of pair of ears 56 of second gasket 54
60 non-threaded throughbore in tab 52 on each side edge of pair of side edges 46 of one end wall 31 of pair of end walls 22 of elongated housing 14
62 alignment collar on tab 52 on each side edge of pair of side edges 46 of one end wall 31 of pair of end walls 22 of elongated housing 14
64 second pair of screws
66 one screw of at least one screw 26
68 blindbore in top edge 50 of other end wall 33 of pair of end walls 22 of elongated housing 14
70 another screw of at least one screw 26
72 blindbore in top edge 48 of one end wall 31 of pair of end walls 22 of elongated housing 14

Second Embodiment 110 improved junction box of the present invention
114 elongated housing
122 pair of end walls of elongated housing 114
124 cover
131 one end wall of pair of end walls 122 of elongated housing 114

DETAILED DESCRIPTION OF THE
PREFERRED EMBODIMENT

Referring now to the figures, in which like numerals indicate like parts, and particularly to FIGS. 1–3, a first embodiment of the improved junction box of the present invention is shown generally at 10 for perpendicularly conducting stiff electrical cable 12.

The improved junction box 10 is of a type having an elongated housing 14 with an open top 16, a base 18, a pair of side walls 20 and a pair of end walls 22 extending upwardly from the base 18 of the elongated housing 14, a cover 24 replaceably closing the open top 16 of the elongated housing 14 by at least one first screw 26, a first gasket 28 weather sealing the cover 24 to the elongated housing 14, a first stub conduit 30 extending axially outwardly from one end wall 31 of and communicating with the elongated housing 14, and a second stub conduit 32 depending from and communicating with the base 18 of the elongated housing 14 adjacent the other end wall 33 of then elongated housing 14 and perpendicular to the first stub conduit 30.

The improvement comprises the one end wall 31 of the elongated housing 14 being replaceably attached to the base 18 of the elongated housing 14 and the pair of side walls 20 of the elongated housing 14 so as to facilitate running the stiff electrical cable 12 through the second stub conduit 32 bending it perpendicularly through the elongated housing 14 and out through the first stub conduit 30 without damage by virtue of a clear passage being provided when the cover 24 and the one end wall 31 of the elongated housing 14 are removed.

The improvement further comprises each side wall 20 of the elongated housing 14 having an exterior surface 34 and an end edge 36 against which the one end wall 31 of the elongated housing 14 abuts and the base 18 of the elongated housing 14 having an end edge 38 against which the one end wall 31 of the elongated housing 14 abuts.

The improvement further comprises the end edge 36 of each side wall 20 of the elongated housing 14 having a pod 40 extending axially along the exterior surface 34 of an associated side wall 20 of the elongated housing 18 and containing a throughbore 42 extending axially therein and communicating with the end edge 36 of the associated side wall 20 of the elongated housing 14.

The improvement further comprises the throughbore 42 in the pod 40 on the end edge 36 of each side wall 20 of the elongated housing 14 having a first portion 44 that is threaded and a second portion 45 that is not threaded and wider but shorter than and communicates with the first portion 44 of the throughbore 42 in the pod on the end edge 36 of the associated side wall 20 of the elongated housing 14 and the end edge 36 of the associated side wall 20 of the elongated housing 14.

The improvement further comprises the one end wall 31 of the elongated housing 14 having a pair of side edges 46 and a top edge 48 and the other end wall 33 of the elongated housing 14 having a top edge 50.

The improvement further comprises each side edge 46 of the one end wall 31 of the elongated housing 14 having a tab 52 extending coplanarly outwardly therefrom in alignment with the pod 40 on the end edge 36 of the associated side wall 20 of the elongated housing 14.

The improvement further comprises a second gasket 54 weather sealing the one end wall 31 of the elongated housing 14 to the base 18 and side walls 20 of the elongated housing 14.

The improvement further comprises the second gasket 54 being substantially U-shaped and running along the end edge 36 of each side wall 20 of the elongated housing 14 and the end edge 38 of the base 18 of the housing 14.

The improvement further comprises the second gasket 54 having a pair of ears 56 aligning with the pod 40 on the end edge 36 of each side wall 20 of the elongated housing 14, respectively.

The improvement further comprises each ear 56 on the second gasket 54 having a throughbore 58 aligning with the second portion 45 of the throughbore 42 in the pod 40 of the end edge 36 of each side wall 20 of the elongated housing 14, respectively.

The improvement further comprises each tab 52 on the one end wall 31 of the elongated housing 14 having a non-threaded throughbore 60 in alignment with the throughbore 42 in the pod 40 of the end edge 36 of the associated side wall 20 of the elongated housing 14.

The improvement further comprises each tab 52 on the end wall 31 of the elongated housing 14 having an alignment collar 62 extending therefrom and passing through the throughbore 58 in an associated ear 56 of the second gasket 54 and interlockingly into the second portion 45 of the throughbore 42 in the pod 40 on the end edge 36 of the associated side wall 20 of the elongated housing 14 so as to maintain the second gasket 54 in place.

The improvement further comprises a second pair of screws 64 that pass freely into the non-threaded throughbore 60 in each tab 52 on the end wall 31 of the elongated housing 14, freely into the throughbore 58 in an associated ear 56 of the second gasket 54, and threadably into the second portion 45 of the throughbore 42 in the pod 40 on the end edge 36 of the associated side wall 20 of the elongated housing 14.

The improvement further comprises the cover 24 and the one end wall 31 of the elongated housing 14 being formed as separate pieces.

The improvement further comprises one screw 66 of the at least one screw 26 threading into a blindbore 68 in the top edge 50 of the other end wall 33 of the elongated housing 14.

The improvement further comprises another screw 70 of the at least one screw 26 threading into a blindbore 72 in the top edge 48 of the one end wall 31 of the elongated housing 14.

Referring now to FIGS. 4–7, a second embodiment of the improved junction box of the present invention is shown generally at 110.

The improved junction box 110 is similar to the improved junction box 10, except that the cover 124 and the one end wall 131 of the elongated housing 114 are formed as one piece.

It will be understood that each of the elements described above, or two or more together, may also find a useful application in other types of constructions differing from the types described above.

While the invention has been illustrated and described as embodied in an improved junction box, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An improved junction box for perpendicularly conducting stiff electrical cable and of a type having an elongated housing with an open top, a base, a pair of side walls and a pair of end walls extending upwardly from the base of the elongated housing, a cover replaceably closing the open top of the elongated housing by at least one first screw, a first gasket weather sealing the cover to the elongated housing, a first stub conduit extending axially outwardly from one end wall of and communicating with the elongated housing, and a second stub conduit depending from and communicating with the base of the elongated housing adjacent the other end wall of the housing and perpendicular to the first stub conduit, said improvement comprising the one end wall of the housing being replaceably attached to the base of the elongated housing and the pair of side walls of the elongated housing so as to facilitate running the stiff electrical cable through the second stub conduit bending it perpendicularly through the housing and out through the first stub conduit without damage by virtue of a clear passage being provided when the cover and the one end wall of the elongated housing are removed, wherein said improvement further comprises each side wall of the elongated housing having an exterior surface and an end edge against which said one end wall of the elongated housing abuts and the base of the elongated housing having an end edge against which said one end wall of the elongated housing abuts, wherein said improvement further comprises said end edge of each side wall of the elongated housing having a pod extending axially along the exterior surface of an associated side wall of the elongated housing and containing a throughbore extending axially therein and communicating with said end edge of the associated side wall of the elongated housing, wherein said improvement further comprises said throughbore in said pod on said end edge of each side wall of the elongated housing having a first portion that is threaded and a second portion that is not threaded and wider but shorter than and communicates with said first portion of said throughbore in said end edge of an associated side wall of the elongated housing and said end edge of the associated side wall of the elongated housing, wherein said improvement further comprises said one end wall of the elongated housing having a pair of side edges and a top edge and the other end wall of the elongated housing having a top edge, wherein said improvement further comprises each side edge of said one end wall of the elongated housing having a tab extending coplanarly outwardly therefrom in alignment with said pod on said end edge of an associated side wall of the elongated housing, wherein said improvement further comprises a second gasket weather sealing said one end wall of the elongated housing to the base and side walls of the elongated housing, wherein said improvement further comprises said second gasket being substantially U-shaped and running along said end edge of each side wall of the elongated housing and said end edge of the base of the elongated housing.

2. The improved junction box as defined in claim 1, wherein said improvement further comprises the cover and said one end wall of the elongated housing being formed as separate pieces.

3. The improved junction box as defined in claim 1, wherein the cover and said one end wall of the elongated housing are formed as one piece.

4. The improved junction box as defined in claim 1, wherein said improvement further comprises one screw of the at least one screw threading into a blindbore in the top edge of the other end wall of the elongated housing.

5. The improved junction box as defined in claim 4, wherein said improvement further comprises another screw of the at least one screw threading into a blindbore in said top edge of said one end wall of the elongated housing.

6. The improved junction box as defined in claim 1, wherein said improvement further comprises said second gasket having a pair of ears aligning with said pod on said end edge of each side wall of the elongated housing, respectively.

7. The improved junction box as defined in claim 6, wherein said improvement further comprises each ear of said second gasket having a throughbore aligning with said second portion of said throughbore in said pod on said end edge of each side wall of the elongated housing, respectively.

8. The improved junction box as defined in claim 7, wherein said improvement further comprises each tab on said end wall of the elongated housing having a non-threaded throughbore in alignment with said throughbore in said pod on said end edge of each side wall of the elongated housing, respectively.

9. The improved junction box as defined in claim 8, wherein said improvement further comprises each tab on said end wall of the elongated housing having an alignment collar extending therefrom and passing through said throughbore in an associated ear of said second gasket and interlockingly into said second portion of said throughbore in said pod on said end edge of the associated side wall of the elongated housing so as to maintain said second gasket in place.

10. The improved junction box as defined in claim 9, wherein said improvement further comprises a second pair of screws that pass freely into said non-threaded throughbore in each tab of said one end wall of the elongated housing, freely into said throughbore in an associated ear of said second gasket, and threadably into said second portion of said throughbore in said pod on said end edge on the associated side wall of the elongated housing.

* * * * *